(12) United States Patent
Emanuel (10) Patent No.: US 7,315,562 B2
(45) Date of Patent: Jan. 1, 2008

(54) STABLE/UNSTABLE OPTICAL CAVITY RESONATOR FOR LASER

(75) Inventor: George Emanuel, Arlington, TX (US)

(73) Assignee: KSY Corporation, Arlington, TX (US)

( * ) Notice: Subject to any disclaimer, the term of this patent is extended or adjusted under 35 U.S.C. 154(b) by 344 days.

(21) Appl. No.: 10/874,064

(22) Filed: Jun. 22, 2004

(65) Prior Publication Data

US 2005/0281310 A1 Dec. 22, 2005

(51) Int. Cl.
*H01S 3/095* (2006.01)
*H01S 3/08* (2006.01)
*H01S 3/082* (2006.01)

(52) U.S. Cl. .................... 372/89; 372/92; 372/95; 372/97; 372/99; 372/108

(58) Field of Classification Search ............. 372/89, 372/92, 95, 97, 99, 108
See application file for complete search history.

(56) References Cited

U.S. PATENT DOCUMENTS

| | | | |
|---|---|---|---|
| 5,012,483 A | | 4/1991 | Reintjes et al. |
| 5,124,998 A | * | 6/1992 | Arrigoni et al. ............. 372/61 |
| 5,764,680 A | | 6/1998 | Watson |
| 6,553,054 B1 | | 4/2003 | Bauer et al. |

OTHER PUBLICATIONS

"Numerical Simulation of the W-Axicon Type Optical Resonator . . . ," by Endo et al., J. Phys. D: Appl. Phys. Vol. 34, pp. 68-77 (2001).*

Wiesemann, W., Longitudinal Mode Selection in Lasers with Three-Mirror Reflectors, Applied Optics, Dec. 1973, pp. 2909-2912, vol. 12, No. 12.

Tate, R.F., et al., Spatial Gain Measurements in a Chemical Oxygen Iodine Laser (COIL), IEEE Journal of Quantam Electronics, Sep. 1995, pp. 1632-1636.

Hager, Gordon, AFRL-Evolving/Future Laser Requirements, Oct. 21-22, 1997.

Wrolstad, P.V., et al.; Stable Resonators with Increased Fundamental Mode Volume for CO2 Laser Oscillators, Journal of Physics, Part E, pp. 193-195, Feb. 1971.

(Continued)

Primary Examiner—Minsun Oh Harvey
Assistant Examiner—Hrayr A. Sayadian
(74) Attorney, Agent, or Firm—Storm LLP; Paul V. Storm; John J. Patti (57) ABSTRACT

An improved resonator and optical cavity is adapted for use with a chemical laser that has a nozzle upstream of the resonator that emits a gain medium in a flow direction, and a pressure-recovery system downstream of the resonator. The optical resonator comprises first and second optical elements that are spaced apart from one another along an optical axis. Each of the optical elements has a selected geometry and a selected optical transmissivity to permit transmissive outcoupling of a beam of laser radiation from the resonator, the outcoupled beam being transmitted about the optical axis. The transmissivity and geometry of each optical element is selected to define an unstable region between the optical elements and around the optical axis, and a stable region in a region surrounding the unstable region and spaced apart from the optical axis.

21 Claims, 2 Drawing Sheets

OTHER PUBLICATIONS

Schellhorn, M.; Improvement of the Beam Quality of a Gasdynamically Cooled CO Laser with an Unstable Resonator by use of a Cylindrical Mirror, Optics Letters, Jun. 15, 1995, vol. 20, No. 12.

Krupke, William F., et al.; Properties of an Unstable Confocal Resonator CO2 Laser System; IEEE Journal of Quantum Electronics, Dec. 1969, vol. QE-5, No. 12, pp. 575-586.

Schwartz, J., et al; Tactical High Energy Laser, Journal of Directed Energy, Fall 2003, pp. 35-47.

Dorko, Ernest A.; Gas and Chemical Lasers and Intense Beam Applications II, Proceedings of SPIE, dated 1999, vol. 3612, pp. 62-70.

Zucker, H.; Optical Resonators with Variable Reflectivity Mirrors, Bell System Technology Journal, Nov. 1970, pp. 2349-2376.

Siegman, A.E.; Stabilizing Output with Unstable Resonators, Laser Focus, 42, May 1971.

* cited by examiner

STABLE/UNSTABLE OPTICAL CAVITY RESONATOR FOR LASER

TECHNICAL FIELD

The present invention relates generally to optical cavities or resonators for laser apparatus. More particularly, the present invention relates to optical cavities or resonators for supersonic flow chemical lasers.

BACKGROUND

The invention of the gas dynamic $CO_2$ laser and, subsequently, the HF/DF laser, indicated the feasibility of gas-flow lasers of high power. These are continuous wave (cw), supersonic flow devices, and, at a high-power level, have a large saturated gain volume. An optical resonator or cavity is used to resonate photons from the gain volume into a coherent and collimated laser beam. Because the flow is supersonic, the cross-sectional area of this gain volume is roughly rectangular (or trapezoidal) and not a disc. Because of this rectangular gain volume, conventional spherical optical elements in the resonator are difficult to use. If the outcoupled beam from the resonator (the "laser beam") is rectangular in cross section, it requires clipping and manipulation to transform it into one with a circular cross section. For a laser system, this process is costly and reduces the beam's power. On the other hand, if the beam emanating from the resonator or optical cavity has a circular cross section, then much of the radiative energy inside the rectangular, box-like optical cavity may, unfortunately, contribute to gas heating and/or parasitic lasing. It is, therefore, difficult to couple the radiative energy in a box-like region into an axially-symmetric outcoupled beam.

The first type of optical cavity or resonator that was used for a laser is referred to as a stable resonator and is described in Wrolstad, K. H., Avizonis, P. V. and Holmes, D. A., "Stable Resonators with Increased Fundamental Mode Volume for CO2 Laser Oscillations" J. Phys., Part E, 4, pp. 143-145 (1971). This reference reports obtaining single transverse mode operation ($TEM_{00}$) with $CO_2$ in a 1.2 cm diameter discharge tube. This beam size diameter, however, is far too small for use with a large, supersonic laser. With a stable resonator, it was realized that operation with a single, low-order mode was not possible. The laser would be multi-mode, which results in an undesirable amount of beam spread when the beam is focused on a distant target. In addition, because the area of the gain volume is rectangular, a stable resonator may fail to fully saturate all of the gain medium. Among other adverse effects, destructive parasitic lasing can then ensue, especially for a large, high-gain laser.

In a conventional chemical oxgen-iodine laser (COIL), the stagnation temperature, static pressure, and Mach number M are about 300 K, a few Torr, and about 2, respectively. The gas is largely helium with most of the balance being oxygen, some of which is in the excited $^1\Delta$ electronic state. The stagnation pressure for this gas is about 60 Torr.

Current COIL practice uses a gain medium that is linear rather than toroidal. In the linear case, the mirrors are located at the far end of two optical ducts, away from the supersonic flow where the gain is located. With a purge gas (helium), the ducts are maintained at a slightly higher pressure than the optical cavity to keep the mirrors from degrading. Some means must be provided, such as a material or aerodynamic window, for transmitting the beam into the ambient atmosphere.

All current chemical lasers utilize an unstable resonator for a variety of reasons that include the following important features:
 (i) A large mode volume.
 (ii) Transverse mode discrimination.
 (iii) Single-ended output.
 (iv) A confocal beam, if desired.
 (v) A central main lobe in the far field.
 (vi) The outcoupled beam stems from an annular portion of the coherent wave that is incident on the mirror. Nevertheless, the outcoupled beam is also coherent.

See Siegman, A. E., "Stabilizing Output with Unstable Resonator," Laser Focus, 42, pp. 42-47 (May 1971) for an early discussion of the benefits of this type of resonator. Krupke, W. F. and Sooy, W. R., "Properties of an Unstable Confocal Resonator CO2 Laser System," IEEE J. Quant. Elect., QE-5(12), pp. 575-586 (1969) describes a three mirror optical system that is current practice. All three mirrors are highly reflective and the resulting beam is toriodal, i.e., in the near field the beam has a hole in it.

Figure 1:
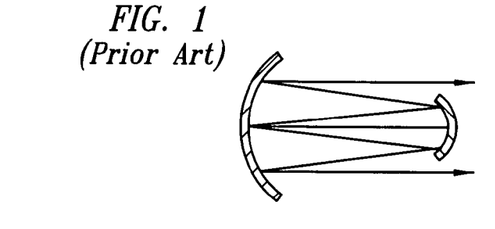
FIG. 1 is a schematic depiction of a prior-art resonator.
Figure 2:
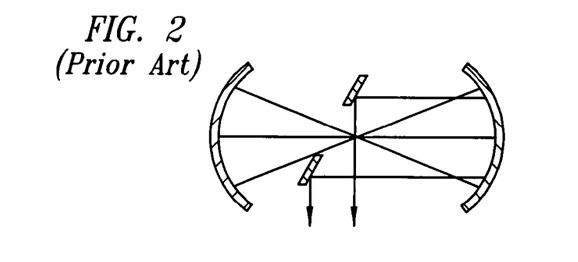
FIG. 2 is a schematic depiction of another prior-art resonator configuration.

To outcouple a beam, current unstable resonators typically use the diffractive loss from the outer portion of a mirrored surface. In the far field, the hole fills in, but as a result of its annular origin, the side lobes contain a larger fraction of the power than if the beam originated from a uniformly illuminated disc with a diameter equal to the outer annular diameter. FIGS. 1 and 2 illustrate schematically these types of resonators, with the lines having arrows representing the outcoupled beam. In FIG. 1, the outcoupled beam simply diffracts around the smaller mirror. In FIG. 2, a "scraper" mirror is used to outcouple a beam. In both cases, the outcoupled beam in the "near field" (close to the resonator) is annular or donut-shaped. In the "far field" (a distance from the resonator), the beam "fills in," but does not have an optimal energy distribution.

As mentioned, the saturated gain region is generally box-like in a gas flow laser. There is a misfit between the geometry of this region and an axially symmetric outcoupled beam. In a large laser, this misfit can result in nonuniform saturation of the gain region. A poorly saturated part of the region, means, at least, some loss of laser power, or, at worst, destructive parasitic lasing. On the other hand, more nearly uniform saturation poses the risk of optically coupling gain and absorption regions. The loss of power may be severe when this happens. In this regard, each type of chemical laser is different. For instance, in COIL the absorbing state is the electronic ground state of the iodine atom. This atom is in its diatomic (non-absorbing) form when the fluid is in chemical equilibrium. Because of its low concentration, however, the three-body recombination rate of iodine atoms is slow. Hence, ground state iodine atoms can remove energy from a coherent radiative field, and then lose this energy by spontaneous emission or collisional deactivation. This loss process can occur in the absorbing, supersonic flow just downstream of the saturated gain region.

Accordingly, a need exists for a resonator or optical cavity design that is particularly adapted to the modern, supersonic flow chemical laser, in particular to the COIL.

SUMMARY

It is a general object of the present invention to provide an improved resonator and optical cavity for use with a chemical laser and particularly the COIL. This and other objects of the present invention are achieved by providing an optical resonator for use with a chemical laser that has a nozzle upstream of the resonator that emits a gain medium in a flow direction. The optical resonator comprises first and second optical elements that are spaced along an optical axis. The optical axis intersects and includes the geometrical center of each optical element. Each of the optical elements has an optical transmissivity, an optical reflectivity, and a geometry selected to permit transmissive outcoupling of a beam of laser radiation from the resonator, the outcoupled beam being transmitted through an outcoupling region in the first optical element that includes the optical axis.

According to the preferred embodiment of the present invention, the first optical element is at least partially transmissive and the second optical element is substantially completely reflective. The second optical element also has at least one surface region that is convex with respect to the first optical element and at least one surface region that is concave with respect to the first optical element, wherein the optical axis is transverse to the flow direction of the gain medium and the second optical element is disposed exterior to the flow of the gain medium.

According to the preferred embodiment of the present invention, the first optical element is a planar member formed of fused silica with a partial, gradient reflective coating that defines a circular outcoupling window or region coaxial and including the optical axis.

According to the preferred embodiment of the present invention, the second optical element is a high-reflectivity mirror.

According to the preferred embodiment of the present invention, the third optical element is a planar member formed of fused silica.

According to the preferred embodiment of the present invention, the convex surface region of the second optical element includes and intersects the optical axis and the concave regions are spaced apart from the optical axis.

According to the preferred embodiment of the present invention, the first optical element forms a portion of a wall connecting the nozzle and the pressure-recovery system and is cooled by the flow of the gain medium.

According to the preferred embodiment of the present invention, a third optical element is disposed along the optical axis between the first and second optical elements, the first and third optical elements cooperating to form two walls of an optical chamber connecting the nozzle to a pressure-recovery system and is cooled by the flow of the gain medium.

According to the preferred embodiment of the present invention, the first and third optical elements are rectangular in the plane perpendicular to the optical axis.

According to the preferred embodiment of the present invention, the transmissivity and geometry of each optical element is selected to define an unstable region between the optical elements and around and including the optical axis, and a stable region in a region surrounding the unstable region and spaced apart from the optical axis.

According to the preferred embodiment of the present invention, the laser gain medium is a supersonic flow of singlet delta oxygen with iodine injected in a chemical oxygen-iodine laser.

DETAILED DESCRIPTION

In its simplest form, a laser cavity (optical cavity or resonator) consists of a gain medium enclosed by two spherical mirrors, where the sides of the cavity are open. "Resonator" refers to the reflection of photons between optical elements, while "cavity" refers to the physical space between the optical elements. The mirrors have a radius of curvature $R_i$, a radius $a_i$, reflectivities $r_i$, and a separation distance L. The radius of curvature $R_i$ is positive if concave toward the gain medium, and L exceeds the $L_g$ gain length. A planar mirror has an infinite radius of curvature. The mirror reflectivity $r_i$ is bounded $0 < r_i \leq 1$. Thus, if mirror $M_1$ has $r_1 = 0.8$, then 20% of the intensity incident on $M_1$ is absorbed by the mirror or transmitted through it. In steady-state operation, this loss would be compensated for by amplification of the intensity by the gain medium. It is useful to note that $r_i$ can vary with location on mirror $M_i$.

The geometrical stability of a resonator is determined by the g parameters $$g_i = 1 - \frac{L}{R_i}, \quad i = 1, 2.$$

If $0 \leq g_1 g_2 \leq 1$ the resonator is stable; otherwise it is unstable. (Siegman) It is neutrally stable if $g_1 g_2$ equals zero or unity.

Figure 3:
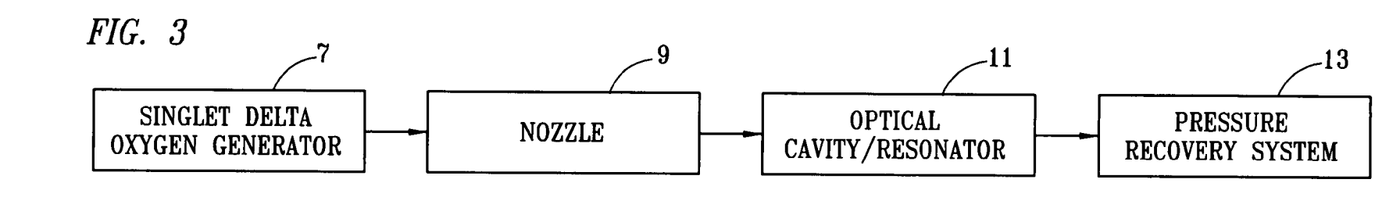
FIG. 3 is a block diagram of a chemical oxygen-iodine laser (COIL) in accordance with the preferred embodiment of the present invention.

FIG. 3 is a block diagram of a chemical oxygen-iodine laser (COIL) of the type contemplated by the present invention. The laser system generally comprises a singlet delta oxygen (gas) generator 7 (SOG), a nozzle 9, an optical cavity or resonator 11, and a pressure recovery system 13. Generated singlet delta oxygen has iodine injected and is accelerated to supersonic velocity by nozzle 9. The supersonic gas flow is employed as the laser gain medium in an optical cavity or resonator 11. The elements of the COIL illustrated in FIG. 3 are reasonably representative of the components of a supersonic flow chemical laser of the type the optical cavity or resonator according to the present invention contemplates.

Optical cavity or resonator 11 has an output of radiant energy ("outcoupled beam") that is commonly referred to as the "laser beam". The supersonic flow from optical cavity 11 has its velocity reduced and static pressure increased by a pressure recovery system 13, which may comprise a diffuser or ejector or a combination of the two. A preferred SOG is described in commonly assigned application Ser. No. 10/453,148 filed Jun. 3, 2003 entitled "Efficient Method and Device for Generating Singlet Delta Oxygen at an Elevated Pressure." A preferred form of nozzle and iodine injector is disclosed in commonly assigned application Ser. No. 10/658,569, filed Sep. 9, 2003, entitled "Improved Laser Nozzle and Iodine Injection for COIL." A preferred form of pressure recovery system is of the diffuser type is disclosed in commonly assigned application Ser. No. 10/874,040, filed concurrently herewith and entitled "Supersonic Diffuser" and of the non-diffuser type in commonly assigned application Ser. No. 10/874,039, filed concurrently herewith and entitled "Laser With Brayton Cycle Pump."

Figure 4:
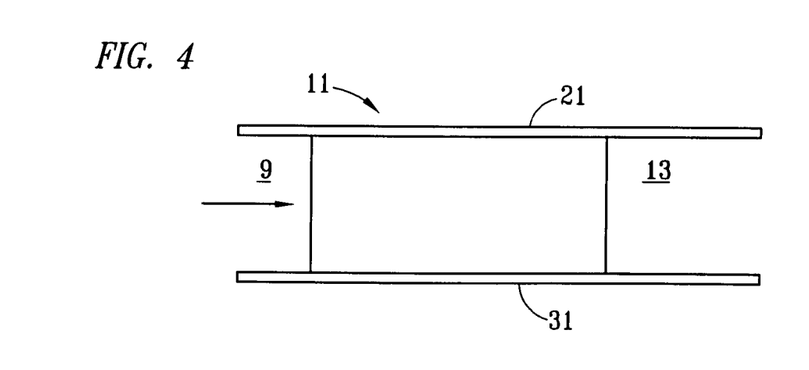
FIG. 4 is a schematic representation of a portion of the optical cavity or resonator according to the preferred embodiment of the present invention.

FIG. 4 depicts how resonator and cavity 11 fits in with upstream nozzle 9 and downstream pressure-recovery system 13. The flow direction of the supersonic gain medium is indicated by the arrow. A pair of optical elements 21, 31 are planar, parallel, and merge smoothly with the upstream nozzle 9 wall surface and the downstream diffuser 13 wall surface. As a consequence, resonator wall junctions do not generate any aerodynamic disturbances. The upstream edge of optical elements 21, 31 may extend into the laser nozzle region 9, wherein their surfaces become part of the nozzle's side walls. The location of the leading (trailing) edge of the optical system should coincide with, or be slightly upstream (downstream), of where saturated gain starts (ends). This is essential in order to avoid parasitic lasing and to maximize the outcoupled power. In this regard, the optical system design automatically avoids the coupling of positive and negative gain regions, as discussed below.

As will be described in greater detail with reference to FIGS. 5 through 7, two of the three optical elements 21, 31, 41 making up resonator 11 actually form the sidewalls of the optical cavity and are flush with the sides of the nozzle and diffuser. Each optical element is aligned through its geometric center, which is referred to as the optical axis of the resonator. Each optical element may be composed of a single lens or mirror, coated appropriately, or several lenses and mirrors bonded together, each of the lenses and mirrors performing the optical functions described below.

Figure 5:
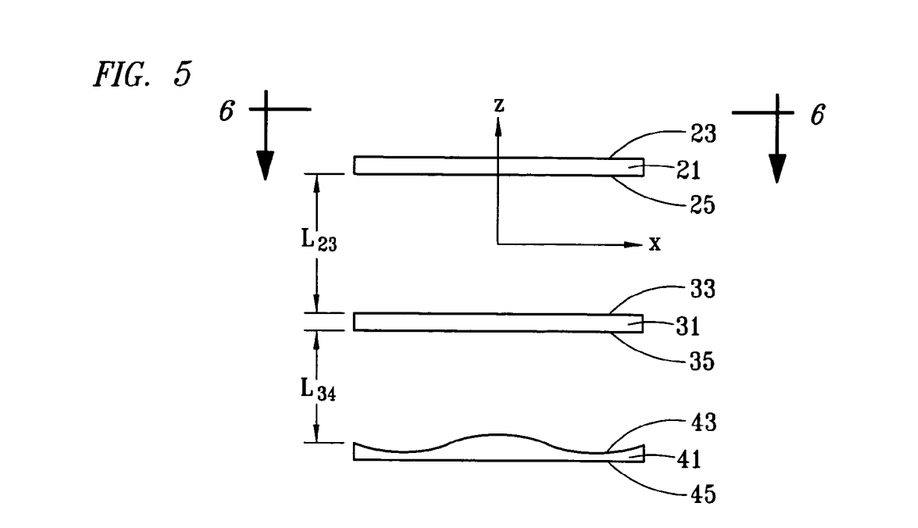
FIG. 5 is a schematic representation of the optical cavity or resonator according to the preferred embodiment of the present invention.

FIG. 5 is a schematic diagram of the resonator configuration according to the preferred embodiment of the present invention, shown without surrounding environment. The supersonic flow, with gain, is in the x-direction and is confined by planar and parallel surfaces 25, 33 of a first optical elements 21 and a third optical element 31 and top and bottom surfaces of the optical cavity, which are similarly planar, parallel surfaces (not shown). There is a boundary layer, which may be laminar, on each of these surfaces. Saturated gain is confined to the box-like region bounded by planar surfaces 25, 33 and those not shown. There is both flow and optical symmetry about the x-axis. The z-axis intersects the geometric center of each optical element 21, 31 and the elements are thus aligned along an optical axis (the z-axis). Generally speaking, the optical axis lies where the peak intensity of the radiation in the resonator (between first and second optical elements) is greatest. According to the preferred embodiment of the present invention, the optical axis coincides with the geometric centers of rectangular optical elements 21, 31, 41. As will be further described below, first and second optical elements 21, 41 are the optically functional elements of the resonator according to the present invention. As alluded to in FIG. 4 and described in greater detail below with reference to FIG. 7, third optical element 31 has only a "structural" function in the illustrated preferred embodiment and is purely optically transmissive. In other embodiments, this third element may have an "optical" function as well (i.e. have regions of variable reflectivity or surface 33).

As illustrated in FIG. 5, there are three optical elements, 21, 31 and 41. Elements 21 and 31 are transmitting elements, while 41 has a highly reflective coating on its surface 43. Adaptive optics can be used with optical element 41, where the adjustments are made through the lower surface 45. Because surface 43 is highly reflective, its substrate material need not be specified or discussed. It is assumed that all optical elements described have negligible, or nearly negligable, absorptivity.

As shown in FIG. 5, reflective optical element 41 has a pair (in actuality one that is circumferential about the z- or optical axis) of concave regions 47 (concave with respect to element 21 and the z- or optical axis) and a convex 49 (again convex with respect to element 21 and the z axis). The resonator is unstable in the vicinity of the z- or optical axis where element 41 is convex 49, but becomes stable as $x^2+y^2$ increases outward from the z axis, where element 41 is concave 47. Everywhere outside of d-diameter outcoupling window 27, the resonator is stable.

Figure 6:
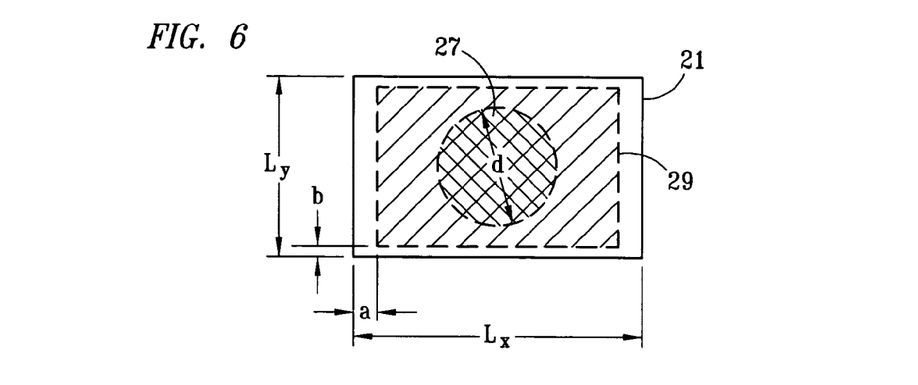
FIG. 6 is a cross-sectional view of the optical cavity of FIG. 3, taken along section line 4-4 of FIG. 5.

FIG. 6 is a plan view of optical element 21, taken along section line 6-6 of FIG. 5. The surfaces of optical elements 21, 31 may extend very small distances a, b, beyond the gain region (the b distance may well be zero). An approximately axially symmetric outcoupled beam 51 (FIG. 7), of diameter d, where $L_x$ and $L_y$ are larger than d, exits the resonator through an outcoupling window 27 of diameter d formed in optical element 21 as described below. This outcoupled beam 51 is the result of "transmissive" outcoupling, as distinguished from the diffractive (FIG. 1) or reflective (FIG. 2) outcoupling of the prior art. A fully enclosed box-like region is contained between elements 31 and 41.

For purposes of simplicity, the view in FIG. 6 shows a rectangular optical element, rather than a tapered one (to correspond with a physical taper between nozzle 9 and pressure-recovery system 13). Which version prevails depends on where the gain first becomes positive. In this embodiment, both first 21 and third 31 optical elements are rectangular in the plane perpendicular to the optical axis. In turn, this primarily depends on the location of the iodine injectors, which are not shown in the Figures. If necessary, or desirable, tapered optical elements can be avoided, e.g., by relocating the iodine injectors downstream. The top and bottom walls connecting optical elements 21 and 31 shown in FIG. 5 may each have a slight (0.5 degree to perhaps 4 degrees) outward angle to compensate for boundary-layer growth and any heat addition inside the laser cavity.

A variable reflectivity coating is on surface 25 such that it is essentially 100% reflective outside of the disc or window 27. Thus, the stable part of the resonator (outside window 27) has no outcoupling, but amplifies and feeds radiative energy inward into the unstable resonator region, which does have outcoupling through transmissive window 27. Although the tiny a and b regions may involve small-signal zero or negative gain, there is little or no coupling between positive and negative gain regions. This approach resolves the difficulties of positive/negative gain coupling, poor gain saturation or parasitic lasing, and the effective coupling of the radiant energy from a box-like volume into an axially symmetric beam. Further, the delineation between outcoupling window 27 and the remainder of surface 25 is illustrated as a sharp boundary, but it need not be. Outcoupling window 27 should include (intersect) the optical (z) axis and be symmetrical in configuration so that the outcoupled beam is similarly symmetrical about the optical axis and includes the optical axis.

Figure 7:
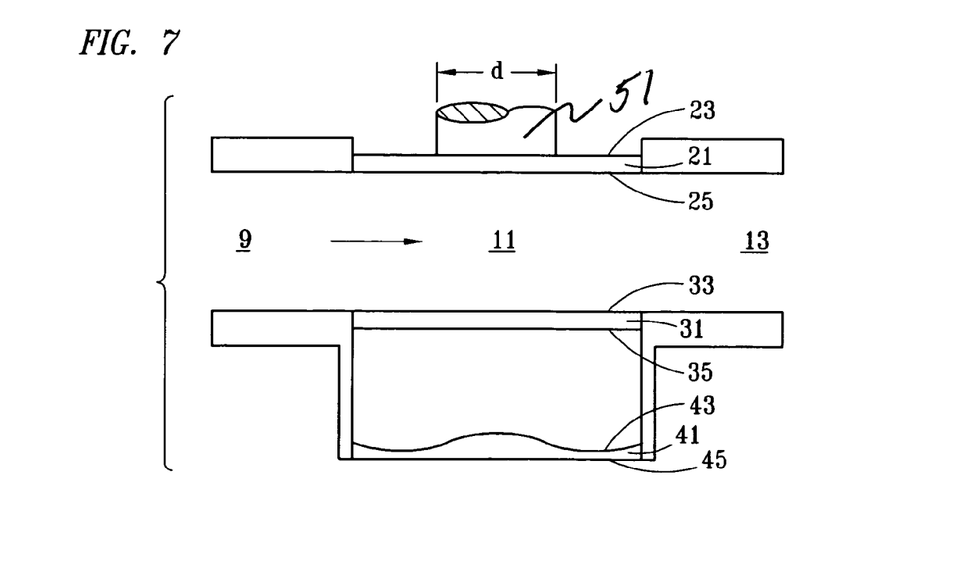
FIG. 7 is an elevation view of one embodiment of the physical arrangement of the optical elements of the optical cavity or resonator according to the preferred embodiment of the present invention.

FIG. 7 illustrates a preferred arrangement for the optical cavity resonator according to the preferred embodiment of the present invention. As indicated schematically in FIG. 4, first and third optical elements 21, 31 are formed and placed within, parallel to, and flush with the sidewalls of the nozzle 9 and diffuser 13 (or other pressure-recovery device). The supersonic gain medium then is available to convectively cool the surfaces of these elements. Second optical element 41 is in a recessed cavity outside the flow of the gain medium. Because according to the preferred embodiment of the present invention, element 41 is ~100% reflective, its energy absorption should not require the cooling necessary for transmissive elements 21, 31. The beam of laser radiation (outcoupled beam 51) then is transmitted through window 27 in element 21 transversely to the flow direction of the supersonic gain medium.

There is only a single set of modes for the stable/unstable resonator. The only loss mechanism is through the variable reflectivity coating resulting in transmissive window 27, of diameter d, on element 21. This surface coincides with the unstable part of the resonator. Outcoupling is, therefore, transmissive, not diffractive. As with a conventional unstable resonator, only a portion of the coherent incident wave is outcoupled. As noted earlier for a conventional unstable resonator, the outcoupled beam is still coherent. A large outcoupled fraction, as noted for a conventional unstable resonator, selects the lowest-order mode while suppressing higher-order modes. Thus, coherent outcoupled beam 51 stems from a single, lowest-order mode for the stable/unstable resonator according to the present invention.

Outcoupled beam 51 comes only from the unstable part of the resonator. In this region, the reflectivity of lower surface 25 of optical element 21 smoothly varies. It changes from its minimum value on the optical or z axis, to effectively unity at the outer edge of window 27. The minimum value for the reflectivity is expected to be finite, but with a value below 0.5. Because of the box-like gain region, the intensity variation of the wave incident on surface 25 may not be axially symmetric about the optical axis. To compensate for this, the variable reflectivity in window 27 would not be radially symmetric. The distribution of reflectivity can be adjusted so that the outcoupled beam 51 has an approximate axially symmetric intensity profile.

In a conventional unstable resonator, the output aperture is nearly uniformly illuminated and has side lobes in the far field. Resonator 11 according to the preferred embodiment of the present invention has a variable reflectivity, and one or more of the surfaces of the optical elements 21, 31, 41 may also have non-spherical curvatures. It is possible to tailor the reflectivities and curvatures such that the outcoupled beam has an axially symmetric, coherent, near gaussian intensity, or irradiance, profile without side lobes. This beam stems from a single, lowest-order mode and contains the radiative energy generated inside the box 29.

Between surfaces 23 and 43 the unstable oscillator contribution should correspond to a positive-branch mode in order to avoid the focusing effect of the negative branch that could destroy the optical element 21, or 31, and cause breakdown in the gas in the focal point region. This should be the case if $g_1 g_2 \geq 1$ on the z or optical axis. The outcoupled beam 51 may be slightly converging or diverging. In other words, a confocal beam may be advantageous but is not a requirement.

Shwartz, J., Nugent, J., Card, D., Wilson, G., Avidor, J. and Behar, E., "Tactical High Energy Laser," J. Directed Energy 1, pp. 35-47 (Fall 2003) points out that a negative-branch unstable resonator has, relative to a positive-branch unstable resonator, superior stability and alignment properties (stability here refers to the beam's stability, in contrast to the resonator's stability, previously discussed in terms of the g parameters). This negative-branch advantage, however, is largely lost for a stable/unstable positive branch resonator. Endo, M., Kawakami, M., Takeda, S., Nanri, K. and Fujioka, T., "Theoretical and Experimental Investigation of Stable-Unstable Resonator Applied for Chemical Oxygen-Iodine Laser," Proc. SPIE, Gas and Chemical Lasers and Intense Beam Applications II, Vol. 3612, pp. 62-70 (1999).

The fully enclosed chamber between elements 31 and 41 can be filled with helium at an average pressure based on the laser cavity and ambient pressures. This helps minimize the pressure loading on the optical elements. Pressure loading on element 41 should not be a problem, since it is non-transmitting. Elements 21 and 31, however, are transmitting and must be able to handle their respective pressure loads. These elements are made from fused silica, discussed shortly, and their thickness depends on their size and the structural load.

The thermal load on 21 and 31, caused by laser beam heating, is effectively treated by the cooling properties of the mostly oxygen, or mostly oxygen plus helium, flow that is adjacent to surfaces 25 and 33. In this regard, it is advisable to keep iodine from condensing, or accumulating, on surfaces 25, 33. This can be done by proper spacing of the two iodine injector struts closest to the side walls that contain surfaces 25 and 33.

FIGS. 4 through 7 assume the outcoupled beam exits through a window 27 adjacent to the gas flow. It may be possible for the beam to exit at the other side of the resonator, through a transmissive window in element 41. The illustrated configuration, however, is preferred, that just described may not allow for adaptive optics.

It is preferable that the transmitting elements 21 and 31 survive in a very high radiative intensity environment. The following considerations insure that this is the case.

(i) Fused silica is used because of its very near unity value for the bulk transmittance at 1.315 μm (the wavelength of COIL radiation). Fused silica may not be unique in this regard. This preferably is the IR grade fused silica with an extremely low $H_2O$ (see International Scientific Products Catalog, pp. 16 and 37, 2003).

(ii) The first and third optical elements 21, 31 in question are very effectively cooled by the laser flow.

(iii) The resonator design according to the present invention is free of a rapid intensity variation transverse to the beam's axis. The two optical elements 21, 31 should, therefore, be free of rapidly changing thermal gradients or of hot spots.

(iv) There is still an upper limit to the intensity that a fused silica window can safely transmit (~30 $kW/cm^2$). To stay below this limit, it may be necessary to increase the nozzle exit height, $L_y$, and the beam diameter, d, while simultaneously keeping the overall power level fixed. This can be done by keeping fixed the product of the $O_2$ ($^1\Delta$) partial pressure inside the singlet oxygen generator (SOG) and the nozzle throat height. The $L_y$ and d lengths then increase by increasing the throat height for a fixed nozzle area ratio. With the SOG pressure decreasing, the diffuser recovered pressure decreases with this approach. This is not necessarily the only design approach that can be used to limit the maximum intensity on a transmitting window.

(v) As the overall power of the laser beam increases, the dimensions $L_y$ and d (FIG. 4) can be increased such that the maximum intensity on transmitting optical elements does not increase. Thus, scaling from one power level to a higher one does not necessarily imply a higher irradiance loading on the transmitting elements.

The preferred COIL can perform this scaling in several ways. The simplest, and perhaps the most effective, technique is to increase the throat height of the laser nozzle now keeping the $O_2(^1\Delta)$ partial pressure, inside the singlet oxygen generator, fixed. These changes increase proportionately both the overall laser power and the nozzle exit height, which is $L_y$.

(vi) As previously noted, only a positive-branch resonator is used.

The various constraints on first, second, and third optical elements 21, 41, and 31 are now discussed in a general manner. It is convenient to introduce the acronyms:

| AR | anti-reflection coating |
|---|---|
| CUR | curved surface |
| PS | planar surface |
| VRC | variable reflectivity coating |

In particular, a curved surface may, in fact, be planar, spherical, or non-spherical. Based on the preceding discussion, the surfaces of optical elements 21, 31, and 41 have the following characteristics:

| | |
|---|---|
| 23 | CUR, AR |
| 25 | PS, VRC |
| 33 | PS, VRC |
| 35 | CUR, VRC |
| 43 | CUR, ~100% reflective |

Surface 23 may actually be planar. Surfaces 25 and 33 are parallel. A varying curvature is shown for surface 43. Thus, the reflectivity, transmissivity and geometry of each of the elements is selected so that transmissive outcoupling occurs through a transmissive (capable of transmitting rather than reflecting or absorbing radiation) window or outcoupling region in one of the optical elements that includes the optical axis and so that the geometrical portion of the resonator surrounding and including the optical axis is unstable and that portion of the resonator apart from the optical axis is stable. The illustration of this surface is merely suggestive of a preferred embodiment that accomplishes the goals.

The proposed approach has the important advantage of flexibility. For instance, an initial effort might have surfaces 23, 25, 33, and 35 as planar and parallel. Surfaces 23, 33, and 35 would have AR coatings. Since element 31 is purely transmitting, its only function is to help confine the laser flow. Only surface 25 has a variable reflectivity coating and only surface 43 has curvature. Moreover, as in Endo, surface 43 could consist of inner and outer spherical surfaces of different radii. The g parameters then satisfy $g_{25}=1$, and $$g'_{43} = 1 - \frac{L_{23} + L_{34}}{R'_{43}} > 1$$

$$g''_{43} = 1 - \frac{L_{23} + L_{34}}{R''_{43}} < 1$$

where a prime (double prime) refers to an unstable (stable) oscillator. The $g_{43}'$ value is for the positive branch, and yields a negative $R_{43}'$ value for a mirror that is convex with respect to the gain medium, as expected. The $g_{43}''$ value yields a positive $R_{43}''$ value for a mirror that is concave with respect to the gain medium.

A reflective surface whose g parameters vary continuously with x and y could be used. In this case, at the optical axis, $g_1 g_2 \geq 1$, and then $g_1 g_2$ decreases smoothly until, at the stable/unstable border, $g_1 g_2 = 1$. Outside of the border, $g_1 g_2$ again decreases smoothly with $x^2 + y^2$, but remains in the stable regime of $0 \leq g_1 g_2 < 1$. On the optical axis, the g parameters may correspond to a confocal oscillator.

Again, the preferred and illustrative embodiment has two "active" or functional optical elements 21, 41. Third optical element 31 is purely transmissive and serves as a window and a structural component of the resonator according to the preferred embodiment of the present invention. As described immediately above, this is an exemplary case and variations are possible.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

I claim:

1. An optical resonator for use with a chemical laser having a nozzle upstream of the resonator that emits a gain medium in a flow direction, the optical resonator comprising:

first and second optical elements that are spaced along an optical axis, each of the optical elements having an optical transmissivity, an optical reflectivity, and a geometry, and at least one optical element being in fluid communication with and cooled by the gain medium;

the transmissivity, reflectivity, and geometry of each optical element being selected to permit transmissive outcoupling of a beam of laser radiation from the resonator through an outcoupling region formed in one of the optical elements, the outcoupling region surrounding the optical axis.

2. The optical resonator according to claim 1, wherein:

the outcoupling region is defined in the first optical element and is at least partially transmissive; and the second optical element is substantially completely reflective and has at least one surface region that is convex with respect to the first optical element and at least one surface region that is concave with respect to the first optical element, wherein the optical axis is transverse to the flow direction of the gain medium and the second optical element is disposed exterior to the flow of the gain medium.

3. The resonator according to claim 1, wherein the first optical element is a planar member formed of fused silica with a partial, gradient reflective coating that defines a circular outcoupling window that includes the optical axis.

4. The resonator according to claim 1, wherein the second optical element is a high-reflectivity mirror.

5. The resonator according to claim 1, wherein a third optical element is a planar member formed of fused silica.

6. The resonator according to claim 2, wherein the convex surface region of the second optical element intersects the optical axis and the concave surface region is spaced apart from the optical axis.

7. The resonator according to claim 1, wherein the first optical element forms a portion of a wall connecting the nozzle to a pressure-recovery system and is cooled by the flow of the gain medium.

8. The resonator according to claim 7, further comprising a third optical element, disposed along the optical axis between the first and second optical elements, and cooled by the flow of the gain medium, the first and third optical elements cooperating to form two walls of the optical resonator connecting the nozzle to the pressure-recovery system.

9. The resonator according to claim 1, wherein the first and third optical elements are rectangular in a plane perpendicular to the optical axis.

10. The resonator according to claim 1, wherein the transmissivity and geometry of each optical element is selected to define an unstable region between the optical elements and including the optical axis, and a stable region in a region surrounding the unstable region and spaced apart from the optical axis.

11. The resonator according to claim 1, wherein the laser gain medium is a supersonic flow of singlet delta oxygen with iodine injected in a chemical oxygen-iodine laser.

12. An optical resonator for use with a chemical laser having a nozzle upstream of the resonator that emits a gain medium in a flow direction, and a pressure-recovery system downstream of the resonator, the optical resonator comprising:
first, second, and third optical elements that are spaced along an optical axis, each of the optical elements having an optical transmissivity, an optical reflectivity, and a geometry;
the first and third optical elements cooperating to define a portion of an optical cavity through which the gain medium flows and cools;
the transmissivity, reflectivity, and geometry of each optical element being selected to permit transmissive outcoupling of a beam of laser radiation from the resonator through an outcoupling region in one of the first and second optical elements, the outcoupling region surrounding the optical axis.

13. The optical resonator according to claim 12, wherein:
the outcoupling region is defined in the first optical element and is at least partially transmissive;
the second optical element is substantially completely reflective and has at least one surface region that is convex with respect to the first optical element and at least one surface region that is concave with respect to the first optical element, wherein the optical axis is transverse to the flow direction of the gain medium and the second optical element is disposed exterior to the flow of the gain medium; and
the third optical element is a substantially purely transmissive window.

14. The resonator according to claim 12, wherein the first optical element is a planar member formed of fused silica with a partial, gradient reflective coating that defines a circular, substantially outcoupling window coaxial with and including the optical axis.

15. The resonator according to claim 12, wherein the second optical element is a high-reflectivity mirror.

16. The resonator according to claim 12, wherein the first optical element is a planar member formed of fused silica.

17. The resonator according to claim 13, wherein the convex surface region of the second optical element intersects the optical axis and the concave surface region is spaced apart from the optical axis.

18. The resonator according to claim 12, wherein the first and third optical elements form portions of walls connecting the nozzle and the pressure-recovery system and are cooled by the flow of the gain medium.

19. The resonator according to claim 12, wherein the first and third optical elements are rectangular in the plane perpendicular to the optical axis.

20. The resonator according to claim 12, wherein the transmissivity and geometry of each optical element is selected to define an unstable region between the optical elements and including the optical axis, and a stable region spaced apart from the optical axis.

21. The resonator according to claim 12, wherein the laser gain medium is a supersonic flow of singlet delta oxygen with iodine injected in a chemical oxygen-iodine laser.

* * * * *

UNITED STATES PATENT AND TRADEMARK OFFICE
CERTIFICATE OF CORRECTION

PATENT NO. : 7,315,562 B2  Page 1 of 1
APPLICATION NO. : 10/874064
DATED : January 1, 2008
INVENTOR(S) : George Emanuel It is certified that error appears in the above-identified patent and that said Letters Patent is hereby corrected as shown below:

Col. 2
Ln. 21, delete "toriodal" and insert -- toroidal --.

Col. 4
Ln. 11, delete "4-4" and insert -- 6-6 --.

Col. 5
Ln. 4, delete second occurrence of the word "is".

Col. 7
Ln. 30, delete "effectively" and insert -- effective --.

Col. 8
Ln. 63, delete "4" and insert -- 6 --.

Signed and Sealed this

Twenty-ninth Day of April, 2008

JON W. DUDAS
*Director of the United States Patent and Trademark Office*